United States Patent [19]
Cunningham, Michael R.

[11] Patent Number: 5,171,052
[45] Date of Patent: Dec. 15, 1992

[54] MANUALLY OPERATED LOAD SHIFTER

[75] Inventor: Cunningham, Michael R., San Antonio, Tex.

[73] Assignee: R&M Industries, Inc., San Antonio, Tex.

[21] Appl. No.: 717,318

[22] Filed: Jun. 18, 1991

Related U.S. Application Data

[63] Continuation-in-part of Ser. No. 693,554, Apr. 30, 1991.

[51] Int. Cl.⁵ ............................ B35G 1/04; B65G 7/12
[52] U.S. Cl. ..................................... 294/19.1; 294/26
[58] Field of Search ........................ 294/4, 15, 17, 19.1, 294/19.2, 22, 24, 26, 27.1, 57, 58; 15/143 B, 144 B; 16/110 R, 111 R, 115; 81/177.2; 403/108, 109, 321, 325, 326-328, 377, 378

[56] References Cited

U.S. PATENT DOCUMENTS

| | | | |
|---|---|---|---|
| 584,133 | 6/1897 | McIntire | 294/26 |
| 1,278,100 | 9/1918 | Bruning | 403/108 |
| 1,686,889 | 10/1928 | Woods | 294/26 |
| 1,753,566 | 4/1930 | Gannon et al. | 294/26 |
| 2,372,743 | 4/1945 | Schofield | 294/26 |
| 2,444,353 | 6/1948 | Kimmey | 294/4 |
| 2,719,688 | 10/1955 | Seifert | 403/109 X |
| 3,076,263 | 2/1963 | Musto | 16/115 X |
| 3,323,826 | 6/1967 | Crowley | 294/19.1 |
| 3,469,878 | 9/1969 | De Haan | 294/19.1 |
| 3,761,121 | 9/1973 | Reid | 294/26 |
| 3,799,099 | 3/1974 | Conover | 294/19.1 X |
| 3,848,689 | 11/1974 | Hilterhaus | 294/26 X |
| 3,947,140 | 3/1976 | Thomas | 403/108 |
| 3,960,218 | 6/1976 | Atchley et al. | 294/19.1 X |
| 4,325,157 | 4/1982 | Balint et al. | 16/115 X |
| 4,344,340 | 8/1982 | Erickson | 81/177.2 |
| 4,395,840 | 8/1983 | Banks | 294/19.1 X |
| 4,496,179 | 1/1985 | Ogle | 294/26 |
| 4,601,505 | 7/1986 | Chilton | 294/26 |
| 4,754,670 | 7/1988 | Raymond | 81/177.2 |
| 4,793,646 | 12/1988 | Michaud, Jr. | 294/19.1 |
| 4,960,015 | 10/1990 | Mathews | 81/177.2 |

FOREIGN PATENT DOCUMENTS

| | | | |
|---|---|---|---|
| 14920 | 2/1905 | Norway | 294/57 |
| 1454223 | 11/1976 | United Kingdom | 294/57 |

Primary Examiner—Johnny D. Cherry
Attorney, Agent, or Firm—Gunn, Lee & Miller

[57] ABSTRACT

A pole for effecting the manual movement of a load of vertically stacked units, such as bottle cases, comprises two telescopically related body members having a grasping element at one exposed end for engaging the lower portion of the stacked load and a transverse handle, mounted on the other exposed end of the telescoped body members and rotatable about the axis of the telescoped body members.

12 Claims, 6 Drawing Sheets

MANUALLY OPERATED LOAD SHIFTER

RELATIONSHIP TO CO-PENDING APPLICATION

This application is a continuation-in-part of pending application Ser. No: 07/693,554, filed Apr. 30, 1991, entitled "Manually Operated Load Shifter".

BACKGROUND OF THE INVENTION

1. Field of the Invention

Applicant's invention relates to a pole-like tool which is manually engagable with the lower portion of a load resting on a supporting surface, such as a floor, to effect the frictionally resisted movement of the load across the floor by a manually applied force.

2. Background Information

The popular concept of a method of moving stacked loads in a warehouse envisions the stacked load being disposed on a pallet and the pallet being engaged by forks of a lift truck to lift the load and move it to any desired location without the application of any manual effort. Unfortunately, there are many warehousing operations, such as in soft drink, milk, and beer bottling plants, supermarkets, and the like, where the stacked loads to be moved comprise vertical stacks of four to eight cases of filled bottles. Such cases weigh between 50 and 60 pounds each. Such stacks are not disposed on a pallet, and there is insufficient room to permit movement of the loads by a lift truck or a two-wheeled dolly, hence such stacked loads must often be manually shifted when movement is desired.

Because of the stacked nature of the load, it is not possible to shift the load by applying a pushing force, because the individual elements of the stacked load would be pushed apart. Rather, it is necessary to manually grasp a lower portion of the load and apply a pulling force to effect the movement of the stacked load. This obviously imposes a substantial strain on the back muscles, and results in debilitating injuries to the workers who are exposed to the necessity of bending over to exert a substantial pulling force with one hand as they move backward with the stacked load, while using the other hand to prevent toppling of the stacked load.

There is a need, therefore, for a manually graspable tool by which the lower portions of the stacked load may be firmly engaged and which will permit the application of an upward and horizontal force to the lower portion of the stacked load without requiring substantial bending and twisting of the back, thus substantially minimizing the opportunity for causing a sprained back.

Such tool has not previously been available in the art. Poles having a hook on the end have one been utilized as fishing gaffs, which are telescopically extendable. However, the fishing gaff always has a minimal length position wherein the hook is enclosed within a surrounding sheath to prevent inadvertent injury to the handler of the gaff. More importantly, the handle of the gaff is longitudinally aligned with the axis of the pole and no substantial pulling force can be exerted on a handle of this configuration.

It has been proposed to utilize a telescopically extendable pole for setting corner irons on the edge of a load of lumber or plywood. See U.S. Pat. No. 3,469,878 to DeHaan. Again, the DeHaan pole has a longitudinally aligned handle, preventing the application of substantial manual forces to the pole.

Thus, a satisfactory tool for manually sliding stacked loads across a floor surface has not been disclosed in the prior art.

SUMMARY OF THE INVENTION

The invention provides a telescopically extendable pole structure formed of two telescopically related cylindrical bodies. A hook or other case grasping element is secured to the outer end of one of the bodies to effect a secure engagement with the lower portion of the stacked load. For example, the bottom case of a stack of cases for soft drink bottles may be conveniently engaged by a hook-shaped configuration.

The total length of the pole is selectable through the provision of detent elements operable between the telescoped bodies to selectively position such bodies in a plurality of axially displaced positions.

The exposed end of the other cylindrical body is provided with a handle which is transversely disposed to the longitudinal axis of the pole. Such transverse handle is freely rotatable about the axis of the pole so as to accommodate any angular position of the arm of the user of the pole. The transverse positioning of the handle permits the application of one or both hands to the pole in a most effective manner. More importantly, the ability to select the effective length of the pole permits the user, whether short or tall, to adjust the pole length so that when the hook is engaged with the lowermost portion of the stacked load, the handle is disposed at an elevation which does not require a substantial bending of the back of the user. Thus, the force applied to the stacked load is both upward and horizontal, but more importantly, the back of the user is not bent to a position where a back sprain is likely to be produced.

In a modification of the invention the inner telescoped body is a rod of hexagonal cross-section and a hollow sleeve or plug is secured in the outer end of the outer body. The bore of the hollow plug is contoured to engage the hexagonal rod to prevent relative rotation of the inner and outer bodies.

Further objects and advantages of the invention will be readily apparent to those skilled in the art from the following detailed description, taken in conjunction with the annexed sheets of drawings, on which is shown two preferred embodiments of the invention.

DESCRIPTION OF THE PREFERRED EMBODIMENT

Figure 1B:
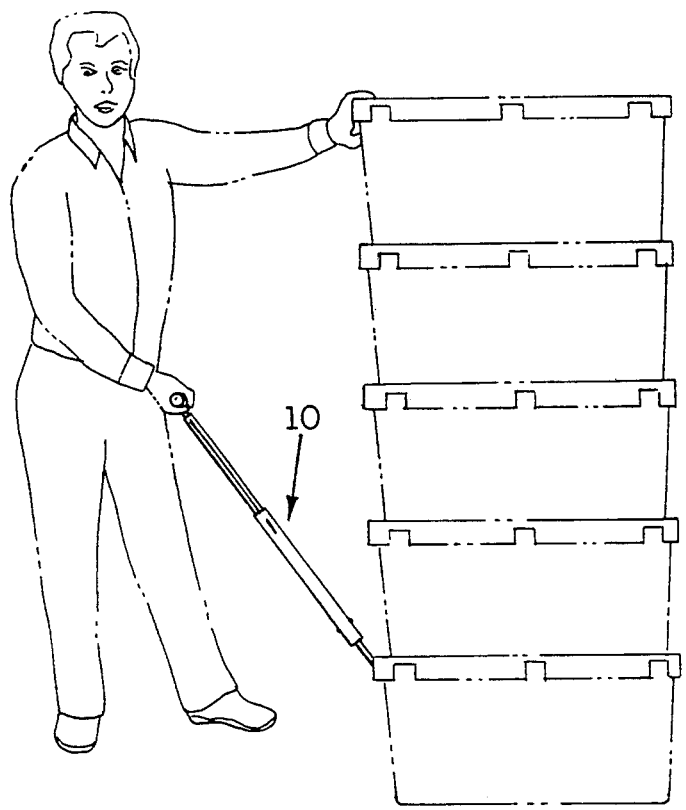
FIG. 1B is similar to FIG. 1A, but showing the workman's body position when using a tool embodying this invention.
Figure 1A:
FIG. 1A is a schematic representation of the position assumed by the body of a workman in attempting to move a stacked load of filled cases without the benefit of any tool.

The problem solved by this invention is dramatically illustrated in FIG. 1A which shows the position assumed by a workman in attempting to move a vertical stack of cases without the tool of this invention. The workman must be bent over to at least a 9° back position in order to grasp the lowermost case with one hand to impart a lifting and pulling movement to such case. The other hand is elevated and engages an upper portion of the case stack to prevent toppling of the cases during such movement. In addition, the body of the workman is twisted. FIG. 1A graphically illustrates the fact that a substantial strain is imposed on the bent and twisted back of the workman, resulting in the definite possibility of back injury and certainly creating lower back pain.

Figure 2A:
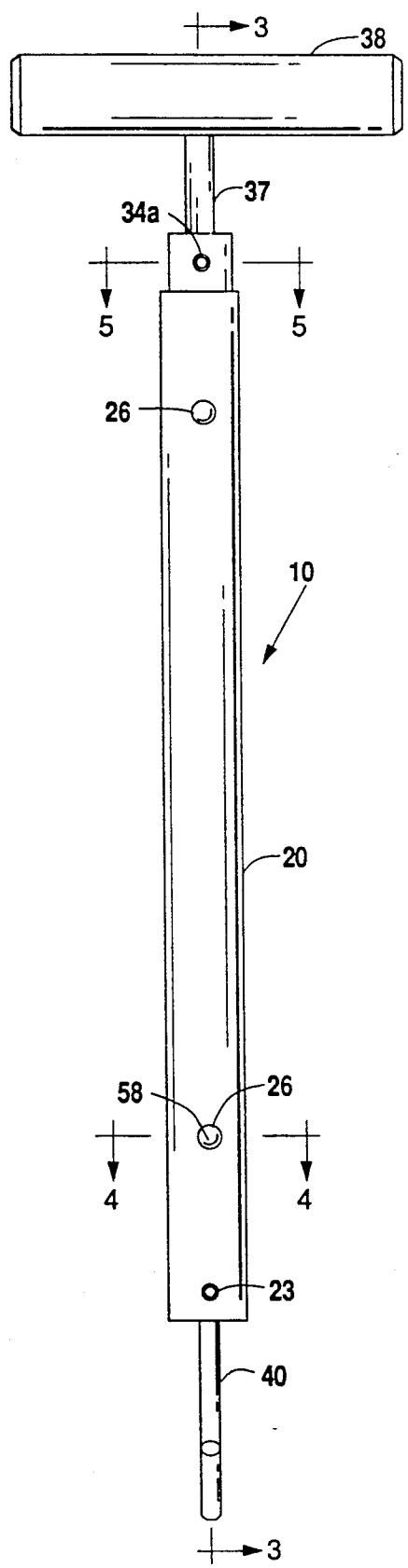
FIG. 2A is a front elevational view of the stack engaging tool embodying this invention with the tool shown in its shortest selectable length.
Figure 2B:
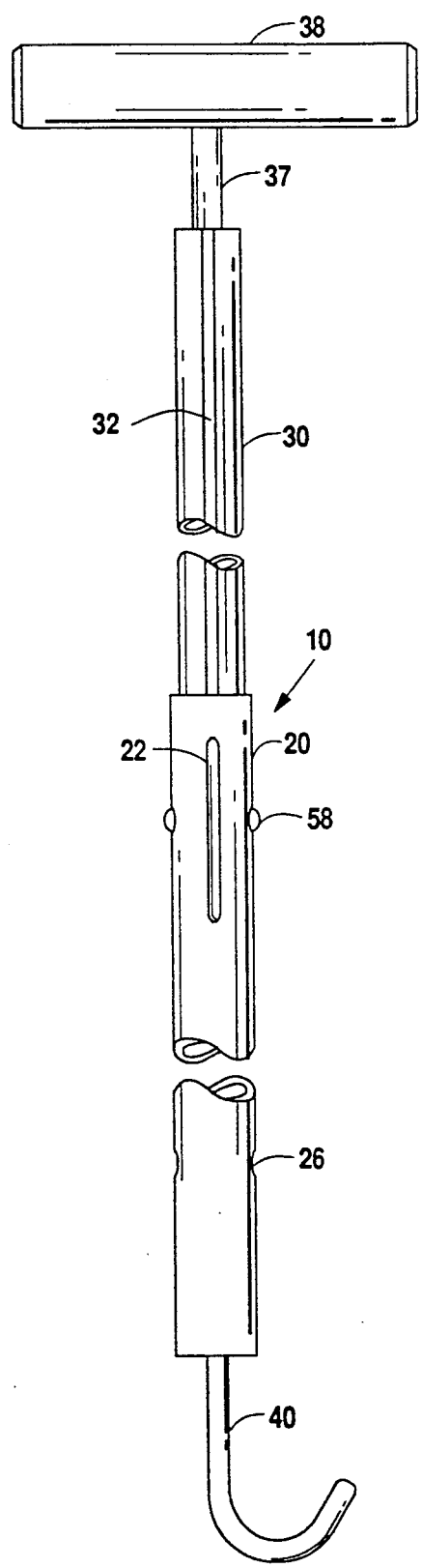
FIG. 2B is a side elevational view showing the tool in its maximum extended length position.
Figure 3:
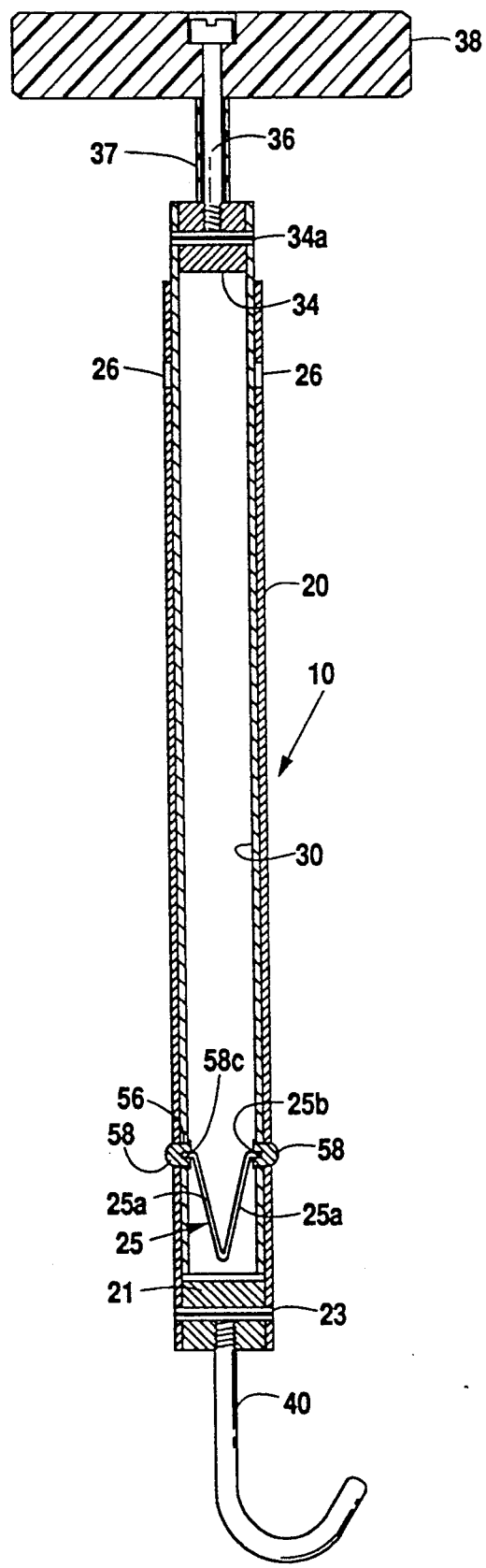
FIG. 3 is a sectional view taken on the plane 3—3 of FIG. 2A.
Figure 4:
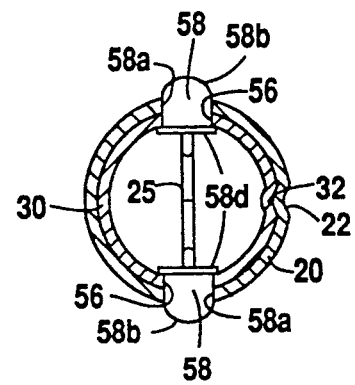
FIG. 4 is an enlarged sectional view taken on the plane 4—4 of FIG. 2A.
Figure 5:
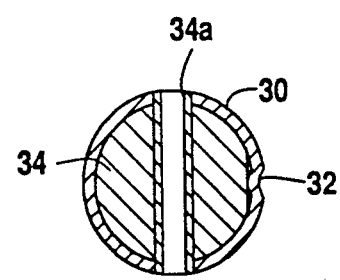
FIG. 5 is an enlarged sectional view taken on the plane 5—5 of FIG. 2A.

Referring now to FIGS. 2A and 2B, a load shifting tool 10 embodying this invention comprises an outer tubular body 20 receiving an inner tubular body 30 in telescopic, sliding relationship. An axial extending groove 32 is formed in the outer wall of the inner tubular body 30 and such groove is engaged by an axially extending, short length rib 22 integrally formed in the wall of the outer tubular body 20 to prevent relative rotation of the tubular bodies. A case grasping element 40 is rigidly secured in a plug 21 which is secured in the exposed end of the outer tubular body 20 by a pin 23 and, as shown in FIGS. 2B and 3, element 40 may comprise a hook.

Figure 6:
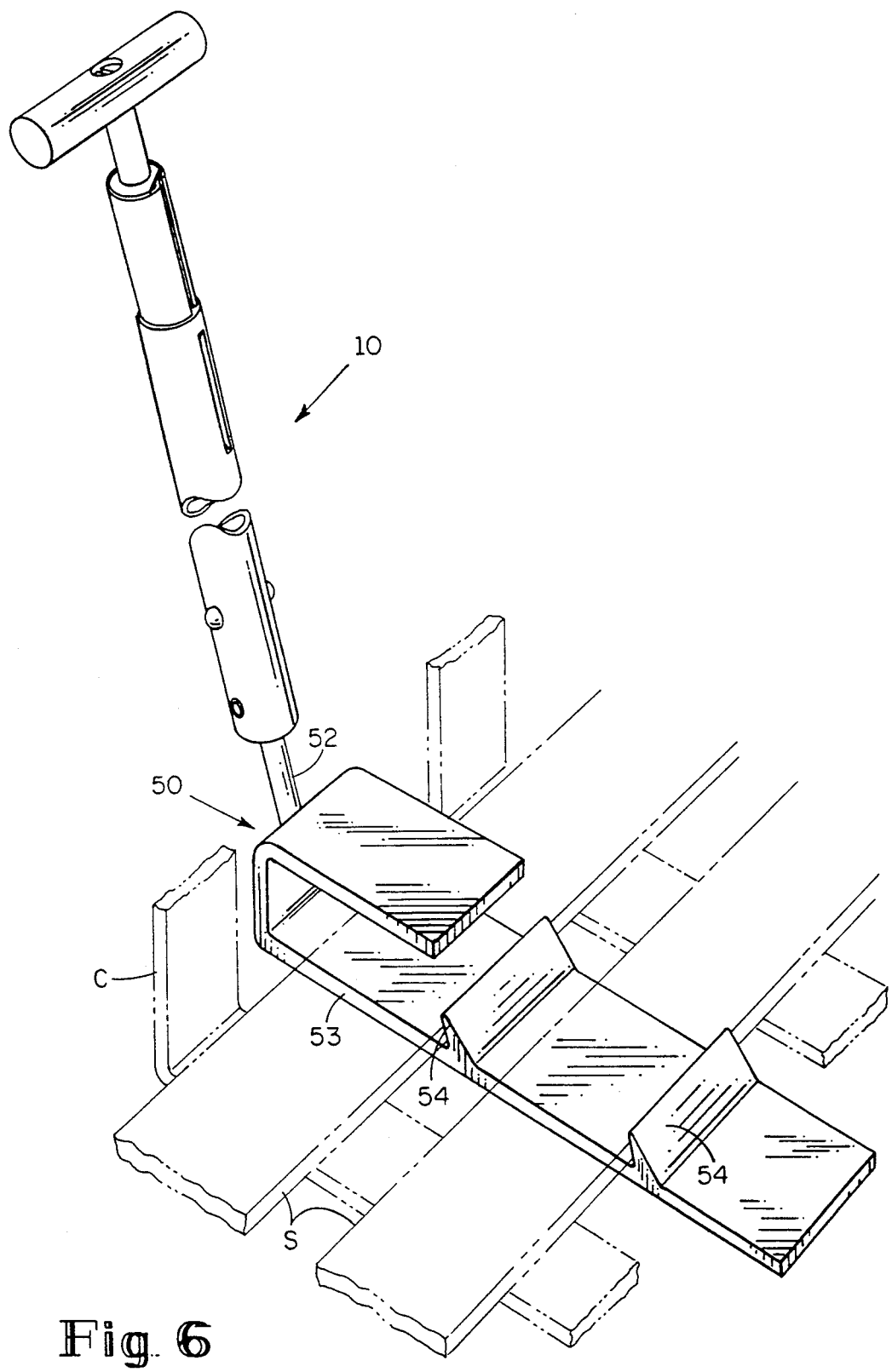
FIG. 6 is a partial perspective view of an alternative case engaging element usable on the tool of FIG. 2A in place of a hook.
Figure 7:
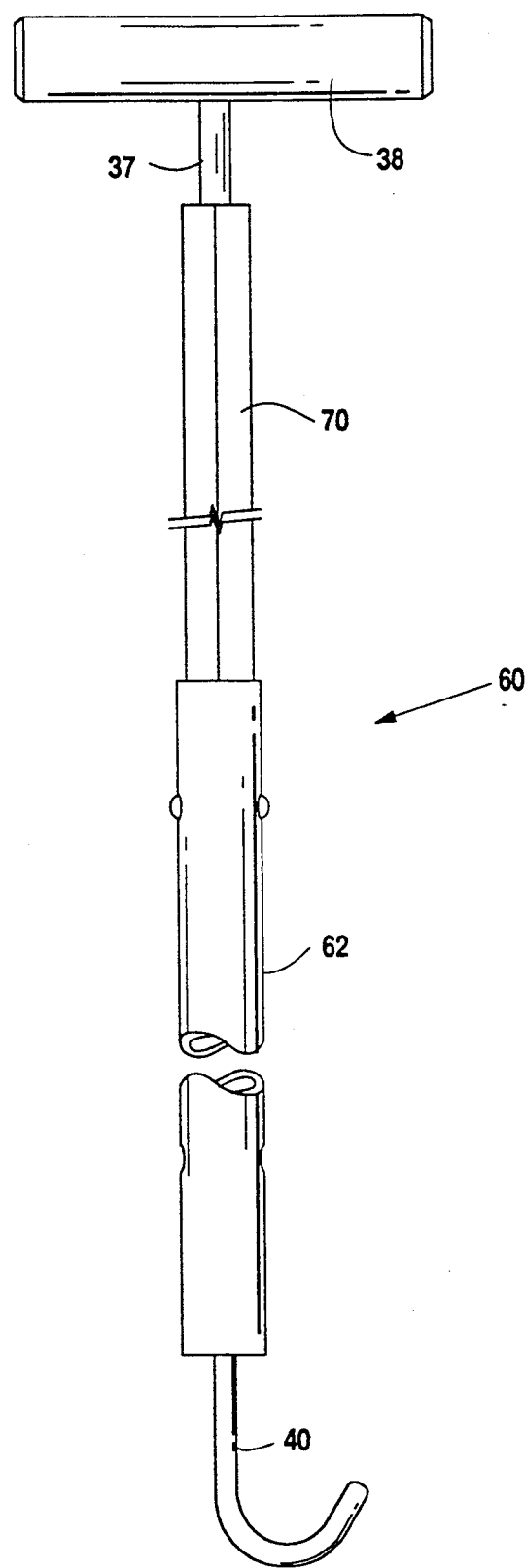
FIG. 7 is an elevational view of a modified construction of the extendable pole.
Figure 8:
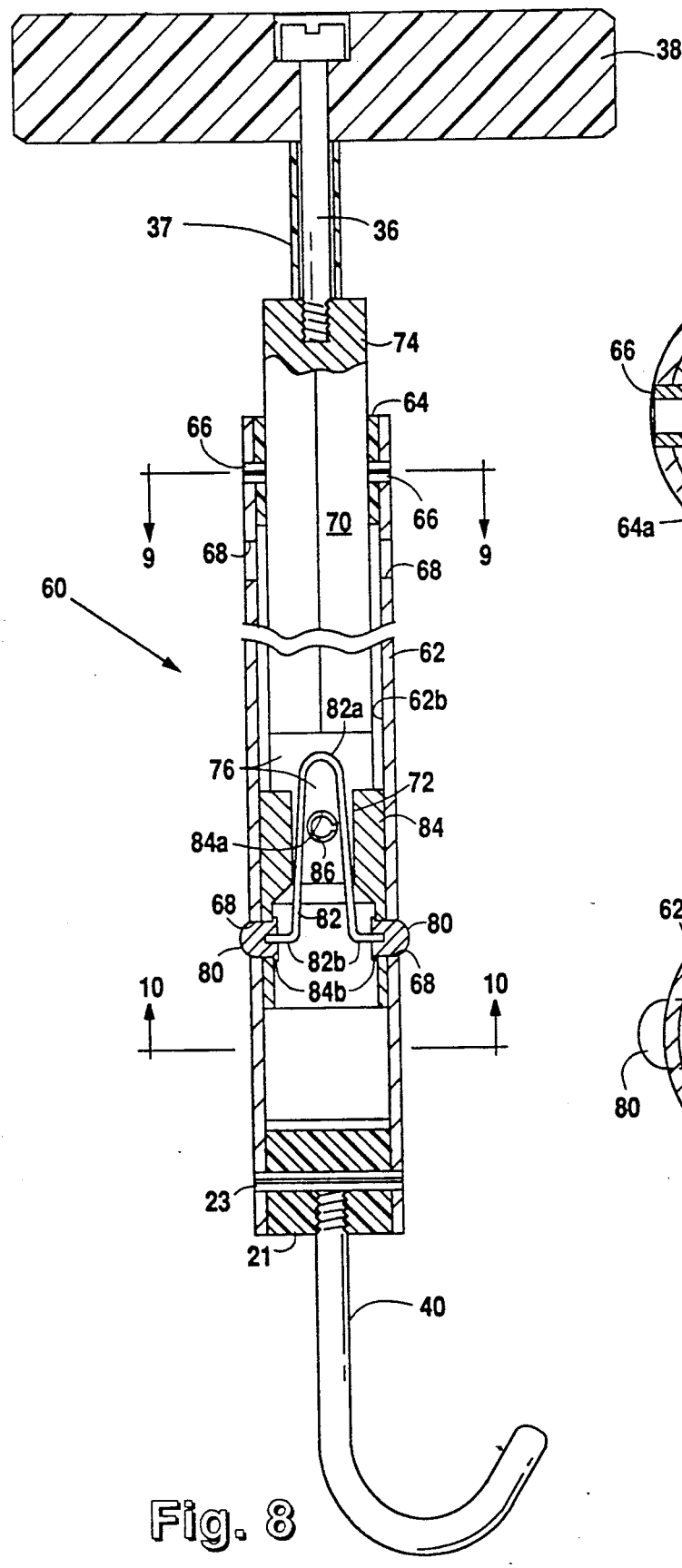
FIG. 8 is a longitudinal sectional view of FIG. 7.

Alternatively, as shown in FIG. 6, the case grasping element 50 comprises a U-shaped configuration having a shank portion 52 insertable in and rigidly securable to the exposed end of the outer tubular body 20 and having rearwardly inclined retention lugs 54 formed on the lower arm 53 of the U-shaped element 50. Such element is usable with a common form of soft drink case C having slots traversing the walls and bottom of the case, thus defining bottom slats S which are engaged by the retention lugs 54 of the U-shaped grasping element 50. Obviously, for different case configurations, different shapes of grasping elements may be readily designed by those skilled in the art.

The exposed end of the inner tubular element 30 mounts a collar 34 by a pin 34a. Collar 34 in turn threadably mounts an axially extending handle bolt 36. As spacer sleeve 37 surrounds the shank portion of handle bolt 36. A handle 38 is transversely mounted on the outwardly projecting end of the handle bolt 36 and is freely rotatable relative to bolt 36 and the longitudinal axis of the tool 10.

From the description thus far, it will be apparent that the length of the tool 10 is readily variable by relative axial movement of the telescopically related inner and outer tubular bodies 30 and 20. Detent means are provided between the tubular bodies 30 and 20 to permit the selective locking of the tubular bodies together in any selected one of a plurality of axially spaced positions, ranging from the minimum length position shown in FIG. 2A to the maximum length position shown in FIG. 2B. Such detent means comprises a plurality of axially aligned pairs of diametrically opposed holes 26 provided in the wall of the outer tubular body 20 to function as detent receivers, plus a single pair of diametrically opposed, detent mounting holes 56 (see FIG. 3) provided in the inner tubular body 30. A pair of detents 58 are provided, with each detent having an inner cylindrical portion 58a and an outwardly facing semi-spherical portion 58b. Additionally, a bore 58c is provided in the center of the cylindrical portion 58a.

Detents 58 are mounted in the detent mounting holes 56 provided on the inner tubular member 30 and are biased outwardly to engage the detent receiving holes 26 in the outer tubular member 20 by a spring 25. The inner ends 58d of cylindrical portions 58a of detents 58 are of larger diameter than detent mounting holes 56, so detents 58 are prevented from moving entirely through holes 56.

The spring 25 comprises a generally V-shaped loop of resilient wire having arm portions 25a which are normally radially spaced to a greater distance than the bore diameter of the inner tubular body 30. The extreme end of each arm 25a is bent at substantially 90° to form projecting portions 25b which are respectively engagable in the bores 58c of the detents 58. Thus, the detents 58 are constantly spring urged outwardly and, when axially aligned with the detent receiving holes 26 provided in the outer tubular body 20, will enter such holes and thus firmly lock the inner tubular body 30 against axial movement relative to the outer tubular body 20.

Referring now to FIG. 1B, the advantage of the tool 10 embodying this invention will be readily apparent. The user of the tool can engage the hook 40 or other case engaging element with the lowermost case of the vertical stack of cases without substantially bending or twisting of the back, even though the other arm is employed to engage an upper portion of the vertical stack of cases to prevent toppling of the stack during the manual movement. The tool 10 imparts an upward and forward sliding movement to the vertical stack of cases as the tool user moves backwardly, but in no situation is the tool user required to bend his back to a degree that would incur the risk of inducing a back sprain.

Figure 9:
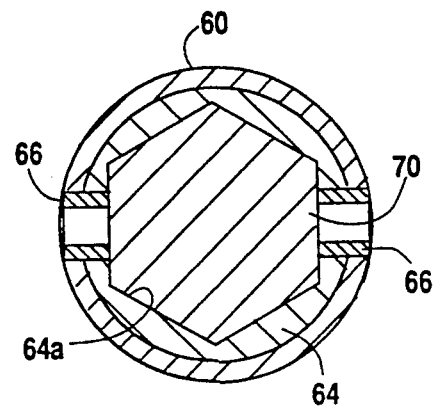
FIG. 9 is a sectional view taken on the plane 9—9 of FIG. 8.
Figure 10:
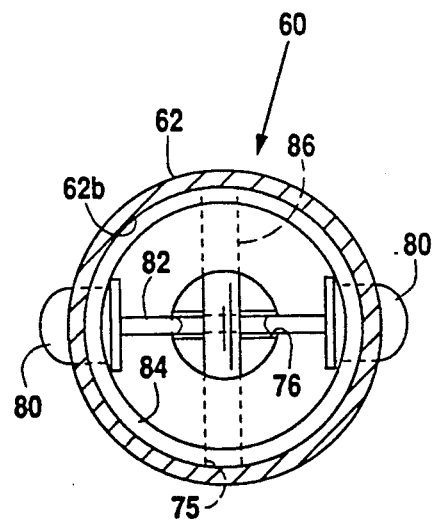
FIG. 10 is a sectional view taken on the plane 10—10 of FIG. 8.

Referring now to FIGS. 7-10, there is shown a modified stack engaging tool 60 embodying this invention. Tool 60 comprises an elongated outer tubular body 62 which is telescopically related to an elongated inner body 70 which is solid and has a non-circular cross-section of substantially smaller area; for example, inner body 70 may have an hexagonal cross-section as shown in FIG. 9. The inner end 72 of inner body 70 is of cylindrical configuration. A handle 38, spacer 37 and mounting bolt 36 effect the mounting of handle 38 to the outwardly projecting end 74 of inner body 70 so that the handle is transversely disposed relative to the axis of the telescopically related inner and outer bodies and is rotatable about such axis.

The end of outer body 62 has a load engaging hook 40 secured thereto in the same manner as the embodiment shown in FIG. 3. Thus, a hollow plug 21 is secured in the bore end of outer body 62 by a transverse pin 23. Hook 40, or any other load engaging member is threaded into plug 21. Alternatively, a handle could be transversely and rotatably mounted on an end of the outer body and a hook secured to the exposed end of the inner body.

To prevent rotation of the telescopically related inner and outer bodies 70 and 62, a hollow plug 64 is snugly mounted within the end of outer body 62 adjacent the handle 38 and has an axial bore 64a contoured to slidably cooperate with the non-circular configuration of the inner body 70. Hollow plug 64 is secured to outer body 62 by one or more pins 66 which traverse the wall of outer body 62 and hollow plug 64.

As in the previously described embodiment of this invention, a plurality of axially spaced pairs of diametrically opposed latching holes 68 are provided in the wall of the outer body 62. A pair of spring pressed detents 80 are respectively mounted on the ends of the arms 82b of a generally U-shaped wire spring 82. The bight portion 82a of spring 82 is mounted in an axial slot 76 provided in the cylindrical inner end 72 of inner body 70. Another bushing or hollow plug 84 is slidably mounted on reduced diameter, cylindrical inner end portion 72 of inner body 70 and is slidably engagable with the bore 62b of outer body 62. Bushing 84 has a pair of diametrically opposed detent holes 84b through which the detents 80 project.

Spring 82 and bushing 84 are retained in position on inner end 72 of inner body 70 by a pressed pin 86 which traverses bushing holes 84a and a hole 75 in inner body 70 which holds pin 86 in position between arm portions 82b of spring 82.

From the foregoing description, it will be readily apparent that relative rotation of the inner and outer bodies 70 and 62 is prevented by the hollow plug 64 without interfering with relative axial movements of such telescopically related bodies. Thus, the outwardly spring biased detents 80 are maintained in axial alignment with the respective latching holes 68 to readily snap into engagement with a selected pair of such holes whenever a change in total length of the tool 60 is deemed desirable by the workperson using the tool to move stacked loads across a floor surface.

In addition to the obvious advantages of the pulling tool embodying this invention in moving an unstable stack of heavy cases, cartons or the like, such tool finds additional utility in permitting a person to engage and lift an item that is disposed at or below the level of their feet. For example, water meter readers must engage a metal hook with a meter cover disposed from 12 to 18 inches below the ground level. The extendable pulling tool embodying this invention may readily be expanded from a compact carrying length to a length long enough to permit lifting of the water meter cover without significant back bending.

Modifications of this invention will readily occur to those skilled in the art from the foregoing description and it is intended that all such modifications fall within the scope of the appended claims.

What is claimed and desired to be secured by Letters Patent is:

1. Apparatus for assisting manual movement of a load having frictional engagement with a floor comprising, in combination;
    an outer tubular body;
    a load engaging element secured to one end of said outer tubular body and engageable with a lower portion of the load;
    an inner cylindrical body having one end slidably telescopically insertable in the other end of said outer tubular body;
    a manually graspable handle;
    means for securing said manually graspable handle to the other end of said inner cylindrical body in transverse, rotatable relation to the axis of said inner cylindrical body;
    said means for securing said manually graspable handle to the other end of said inner cylindrical body comprises a bolt coaxially rotatably mounted in said other end of said inner cylindrical body and having a headed end portion projecting outwardly;
    said handle being traversed and axially restrained by said bolt; and
    detent means operable between said outer tubular body and said inner cylindrical body to rigidly secure said bodies in any selected one of a plurality of axially displaced positions, thereby permitting a user to select an axial separation of said load engaging element and said manually graspable handle that minimizes back strain for a person moving said load by pulling on said handle.

2. The apparatus of claim 1 comprising:
    a longitudinally extending groove in the outer surface of said inner cylindrical body; and
    an inwardly directed projection on said outer tubular body engagable in said groove to prevent relative rotational movement of said bodies to maintain said detent means in axial alignment.

3. The apparatus of claim 1 wherein said inner cylindrical body is tubular and said detent means comprises;
    a plurality of axially spaced pairs of diametrically opposed detent receiving holes in the wall of the outer one of said bodies;
    a single pair of diametrically opposed detent mounting holes in the wall of the inner one of said bodies;
    a pair of detents having cylindrical portions respectively freely insertable in said detent mounting holes and semi-spherical end portions respectively insertable in said detent receiving holes; and
    a single spring disposed within the bore of said inner body and biasing said detents radially outwardly.

4. The apparatus of claim 3 wherein each said detent has an inwardly facing bore and said single spring comprises a generally V-shaped loop of resilient wire compressible by insertion in said bore of said inner body; and
    said wire loop having bent end portions respectively engageable in said inwardly facing bores of said detents.

5. The apparatus of claim 3 further comprising:
    a longitudinally extending groove in the outer surface of said inner cylindrical body; and
    an inwardly directed projection on said outer tubular body engagable in said groove to prevent relative rotation of said bodies to maintain said detent mounting holes in axial alignment with said detent receiving holes.

6. Apparatus for assisting manual movement by an operator of a member disposed at or below the operator's foot level, comprising, in combination;
    a pair of elongated bodies disposed in coaxial telescopic relation and being relatively axially movable; said pair of elongated bodies consisting of an inner elongated body and an outer elongated body; both of said elongated bodies are tubular;
    an engaging element secured to one end of one of said elongated bodies and engagable with said member;
    a manually graspable handle;
    means for securing said handle to one end of the other of said elongated bodies in transverse relationship to the common axis of said bodies;
    said means for securing said handle to one end of the other of said elongated bodies comprises a bolt coaxially mounted in said one end of the other of said elongated bodies and having a headed end portion projecting outwardly;

said handle being trasversed and axially restrained by said bolt;

detent means operable between said bodies to rigidly secure said bodies in any selected one of a plurality of axially displaced relative positions, thereby permitting the operator to select an axial separation of said engaging element and said manually graspable handle that minimizes back strain for the operator moving said member by pulling on said handle;

said detent means comprises a plurality of axially spaced pairs of diametrically opposed detent receiving holes in the wall of said outer elongated body; a single pair of diametrically opposed detent mounting holes in the wall of said inner elongated body; a pair of detents having cylindrical portions respectively freely insertable in said detent mounting holes and semi-spherical end portions respectively insertable in said detent receiving holes; and a single spring disposed within the bore of said inner elongated body and biasing said detents radially outwardly.

7. The apparatus of claim 6 wherein each said detent has an inwardly facing bore and said spring comprises a generally V-shaped loop of resilient wire compressible by insertion in said bore of said inner elongated body;

said wire loop having bent end portions respectively engagable in said inwardly facing bores of said detents.

8. The apparatus of claim 6 further comprising:

a longitudinally extending groove in the outer surface of said inner elongated body;

an inwardly directed projection on said outer elongated body engagable in said groove to prevent relative rotation of said bodies to maintain said detent mounting holes in axial alignment with said detent receiving holes.

9. The apparatus of claim 6 wherein said manually graspable handle is rotatable about the longitudinal axis of said elongated bodies.

10. Apparatus for assisting manual movement by an operator of a member disposed at or below the operator's foot level, comprising, in combination:

a pair of elongated bodies disposed in coaxial telescopic relation and being relatively axially movable; said pair of elongated bodies consisting of an inner elongated body and an outer elongated body; holes in the wall of said second hollow plug; and a plurality of axially spaced pairs of diametrically opposed latching holes in the wall of said outer elongated body, said detents being respectively receivable within said latching holes when aligned therewith.

11. The apparatus of claim 10 wherein said manually graspable handle is rotatable about the longitudinal axis of said elongated bodies.

12. The apparatus of claim 10 wherein said means for securing said bight portion of said U-shaped spring within the bore of said second hollow plug comprises an axially extending slot in said inner end of said inner elongated body receiving said bight portion therein; and a pin diametrically traversing said second hollow plug and said axially extending slot in said inner end of said inner elongated body; and said pin passing between said spring arm portions of said U-shaped spring.

* * * * *